United States Patent [19]

Porte et al.

[11] Patent Number: 5,737,914
[45] Date of Patent: Apr. 14, 1998

[54] DEVICE FOR FIXING AN AIR INTAKE TO A JET ENGINE AND JET ENGINE INCORPORATING SUCH A DEVICE

[75] Inventors: Alain Porte; Jean-Louis Lasserre, both of Colomiers, France

[73] Assignee: Aerospatiale Societe Nationale Industrielle, Paris Cedex, France

[21] Appl. No.: 608,594

[22] Filed: Feb. 28, 1996

[30] Foreign Application Priority Data

Feb. 28, 1995 [FR] France .................................. 95 02302

[51] Int. Cl.⁶ .............................. F02C 7/20; F02C 7/04
[52] U.S. Cl. ................ 60/226.1; 60/39.31; 244/53 B; 244/54; 244/129.4
[58] Field of Search ................ 60/226.1, 39.31; 244/53 B, 53 R, 54, 129.4, 129.5

[56] References Cited

U.S. PATENT DOCUMENTS

| | | | |
|---|---|---|---|
| 3,347,578 | 10/1967 | Sheehan et al. | 244/54 |
| 3,474,988 | 10/1969 | Cox et al. | 244/53 B |
| 3,718,171 | 2/1973 | Godwin | 244/129.5 |
| 3,763,874 | 10/1973 | Wilde et al. | 244/53 B |
| 4,037,809 | 7/1977 | Legrand | 60/226.1 |
| 4,044,973 | 8/1977 | Moorehead | 60/39.31 |
| 4,132,069 | 1/1979 | Adamson et al. | 60/39.31 |
| 4,132,240 | 1/1979 | Frantz | 244/53 B |
| 4,327,548 | 5/1982 | Woodward | 60/226.1 |
| 4,474,346 | 10/1984 | Murphy et al. | 60/39.31 |
| 4,658,579 | 4/1987 | Bower et al. | 60/226.1 |
| 4,825,648 | 5/1989 | Adamson | 60/226.1 |
| 5,046,689 | 9/1991 | Shine | 244/53 R |
| 5,157,915 | 10/1992 | Bart | 60/226.1 |
| 5,203,525 | 4/1993 | Remlaoui | 244/129.4 |
| 5,213,286 | 5/1993 | Elliot et al. | 244/129.4 |
| 5,372,338 | 12/1994 | Carlin et al. | 60/39.31 |

FOREIGN PATENT DOCUMENTS

| | | |
|---|---|---|
| 0 372 675 | 6/1990 | European Pat. Off. . |
| 2 476 016 | 8/1981 | France . |
| 2 069 427 | 8/1981 | United Kingdom . |

Primary Examiner—Timothy Thorpe
Assistant Examiner—Ted Kim
Attorney, Agent, or Firm—Burns, Doane, Swecker & Mathis, LLP

[57] ABSTRACT

Device for fixing an air intake to a jet engine and jet engine incorporating such a device.

This device for fixing an air intake (24) to a jet engine (10) installed on a support strut (12) and having a fan (18) and a fan frame or case (20) is characterized in that the device has a hinge (32) fitted between the air intake (24) and the support strut (12) of the jet engine (10), in order to support and pivot the air intake (24) between a closed position, where the intake (24) and the fan frame (20) are arranged substantially coaxially, and an open position, where the intake is angularly spaced from said frame (20).

10 Claims, 4 Drawing Sheets

DEVICE FOR FIXING AN AIR INTAKE TO A JET ENGINE AND JET ENGINE INCORPORATING SUCH A DEVICE

DESCRIPTION

1. Technical Field

The present invention relates to a device for fixing an air intake to a jet engine. It applies to all fan jet engines or turbofan engines, in which a secondary air flow supplied by a fan is ducted by a pod. In order to improve maintenance, the invention more specifically relates to a fixing device permitting an easier removal of the air intake, which forms the front part of the pod.

The invention also relates to a jet engine incorporating such a fixing device.

2. Prior Art

The air intake is normally fixed to the front of a structure known as the fan frame or case, forming the inner envelope of the pod in the region surrounding the fan. The air intake makes it possible to duct the entering air flow into the fan. The means for fixing the air intake to the fan frame generally incorporate a coupling of the clamp or flange type, connected by a plurality of bolts regularly distributed over the circumference of the jet engine.

However, maintenance to the engine relatively frequently requires the removal of the air intake. Particularly due to the size of the intake, this operation is very costly not only as regards time, but also as regards means. Thus it is necessary to release and remove a large number of flange fixing bolts. It is also necessary to have specific handling installations, such as a mobile overhead crane for supporting the air intake during its removal. Finally, it is necessary to have an equipment able to transport and store the air intake during engine maintenance. Difficulties are also encountered with regards to the positioning and centring of the air intake with respect to the fan frame during its reinstallation.

The complexity of these operations gives rise to a long grounding of the aircraft equipped with such engines. The grounding of the aircraft increass if the tools, such as the overhead mobile cranes necessary for the removal of the air intake, are not always available at the location where the aircraft is positioned.

An object of the present invention is to propose a fixing device not suffering from the aforementioned disadvantages and which allows a rapid removal of the air intake, no matter what the location of the aircraft.

Another object of the invention is to propose a fixing device permitting an easy positioning and centring of the air intake with respect to the fan frame, particularly during its installation.

Another object of the invention is to propose a fixing device permitting the removal of the air intake from the jet engine without having to use external, heavy installations such as mobile overhead cranes.

DESCRIPTION OF THE INVENTION

In order to achieve these objects, the invention more specifically relates to a device for fixing an air intake to a jet engine installed on a support strut and having a fan and a fan frame, characterized in that the device incorporates a hinge installed between the air intake and the support strut of the jet engine, in order to support and pivot the air intake between a closed position, where the intake and the fan frame are arranged substantially coaxially, and an open position, where the intake is angularly spaced from said frame.

The hinge makes it possible to pivot the air intake like a door or flap. Thus, when the air intake is spaced apart from the frame, it is still held by the hinge and tools, such as mobile overhead cranes for holding the same are rendered unnecessary.

Moreover, the correct positioning of the air intake relative to the frame is automatic, when it is brought from the open to the closed position.

Preferably, the hinge has a pivot pin substantially orthogonal to the longitudinal pin of the fan frame.

The term engine strut is understood to mean a part by which the engine is suspended on an aircraft fuselage or wing element. The strut has adequate rigidity characteristics for the fixing of the hinge.

Moreover, as the air intake is installed on the strut by means of the hinge, the aerodynamic and inertia forces applied to the air intake can be at least partly withstood by the strut when the hinge is installed in a permanent manner.

The hinge of the fixing device e.g. has a first arm connected to the strut and a second arm connected to the air intake.

To facilitate the removal of the air intake, i.e. to pivot the air intake from the closed position to the open position, the hinge can be equipped with at least one jack. This e.g. hydraulic jack is also used for holding the air intake in the open position during maintenance operations and then to bring it into the closed position when said maintenance operations are completed.

According to another aspect of the invention, the fixing device can also incorporate means for locking the air intake to the fan frame. These locking means e.g. comprise a locking member at a location diametrically opposite to the hinge.

In a special embodiment, the locking member can have one or more rods connecting the air intake to the fan frame.

The locking means can also comprise pod cowls, which preferably extend on either side of the strut and which can come into engagement with the air intake by a groove and knife system. When the cowls are closed, the knives are engaged in the groove or grooves and lock the air intake in the closed position.

Optionally, the coupling between the air intake and the fan frame can be completed by flanges formed on each of these parts and connected by circumferentially distributed bolts to the air intake in the engine.

The hinge can be fitted in a permanent manner. However, according to a particularly advantageous aspect of the invention, the hinge is detachable and then forms a tool. This tool is placed in a housing or compartment of the pod surrounding the fan frame, when maintenance work requires the removal of the air intake. The tool is then removed from the housing, when said work is completed.

The invention also relates to a jet engine incorporating a fixing device of the type defined hereinbefore.

Other features and advantages of the invention can be gathered from the following description of non-limitative embodiments.

DETAILED DESCRIPTION OF EMBODIMENTS OF THE INVENTION

Identical references are allocated to identical to similar parts in FIGS. 1 to 4.

Figure 1:
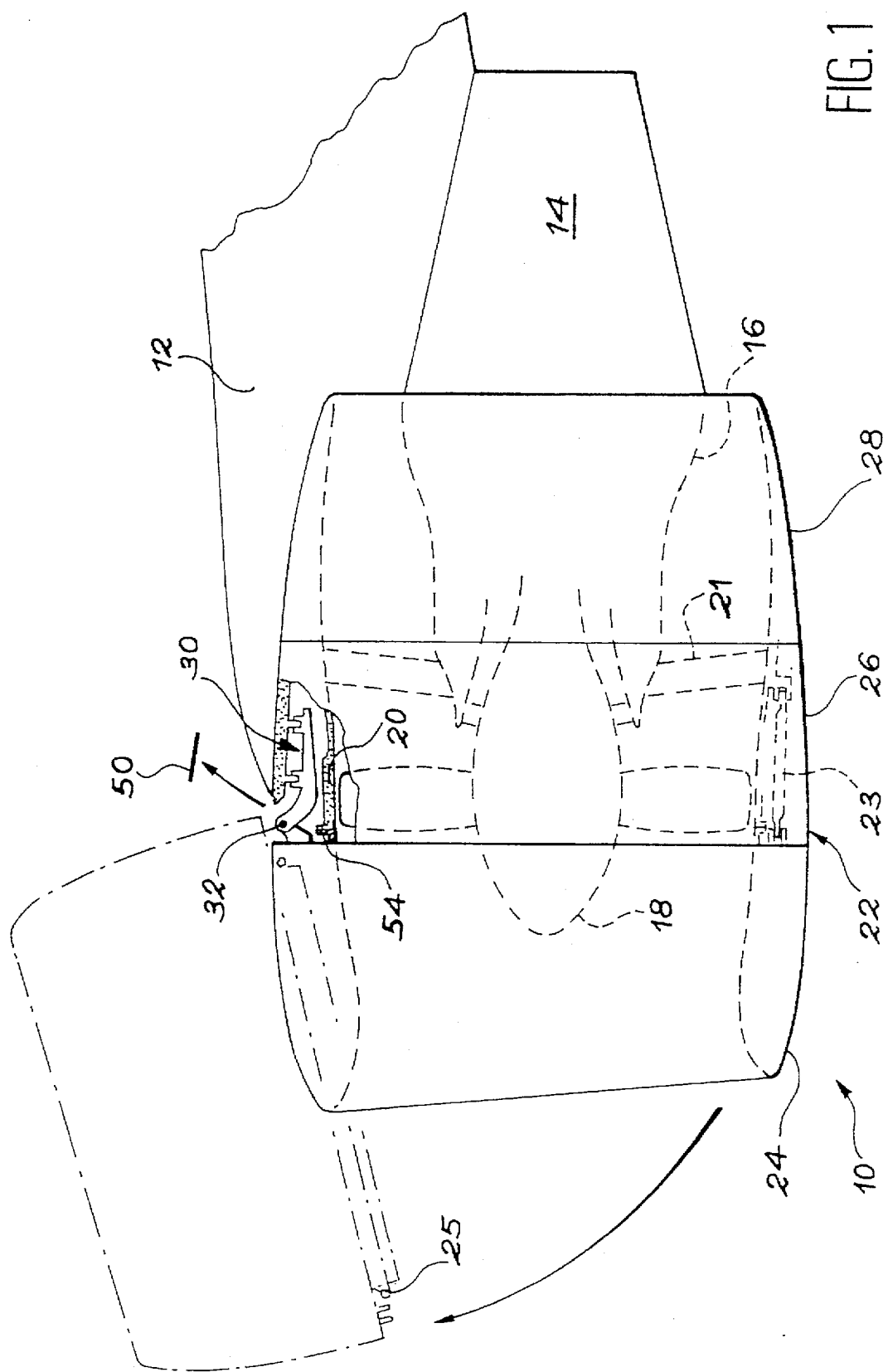
FIG. 1 is a diagrammatic view of an aircraft jet engine equipped with an air intake fixing device according to the invention.

In general terms, reference numeral 10 designates in FIG. 1 an aircraft jet according to the invention. It is more specifically a turbofan engine. The jet engine 10 is suspended on a not shown, wing element of an aircraft by a strut 12. It has a central part 14 with a known construction located in an engine case 16. The not shown, low pressure turbine of said central part 14 drives a fan 18 positioned at the front of the engine. The fan 18, equipped with blades, is surrounded by fan frame or case 20 connected to the central part 14 of the engine by at least one set of arms 21. The fan frame forms an element of the inner envelope of a pod 22, which coaxially surrounds the central part 14. The function of the pod 22 is to duct the secondary air flow produced by the fan 18 around the engine case 16.

The pod 22 essentially has three parts. A front part forms an air intake 24, an intermediate part 26, which includes the fan frame 20 and is generally equipped with cowls giving access to certain equipments, and a rear part generally formed by two articulated cowls giving access to the central part 14 of the engine.

Figure 2:
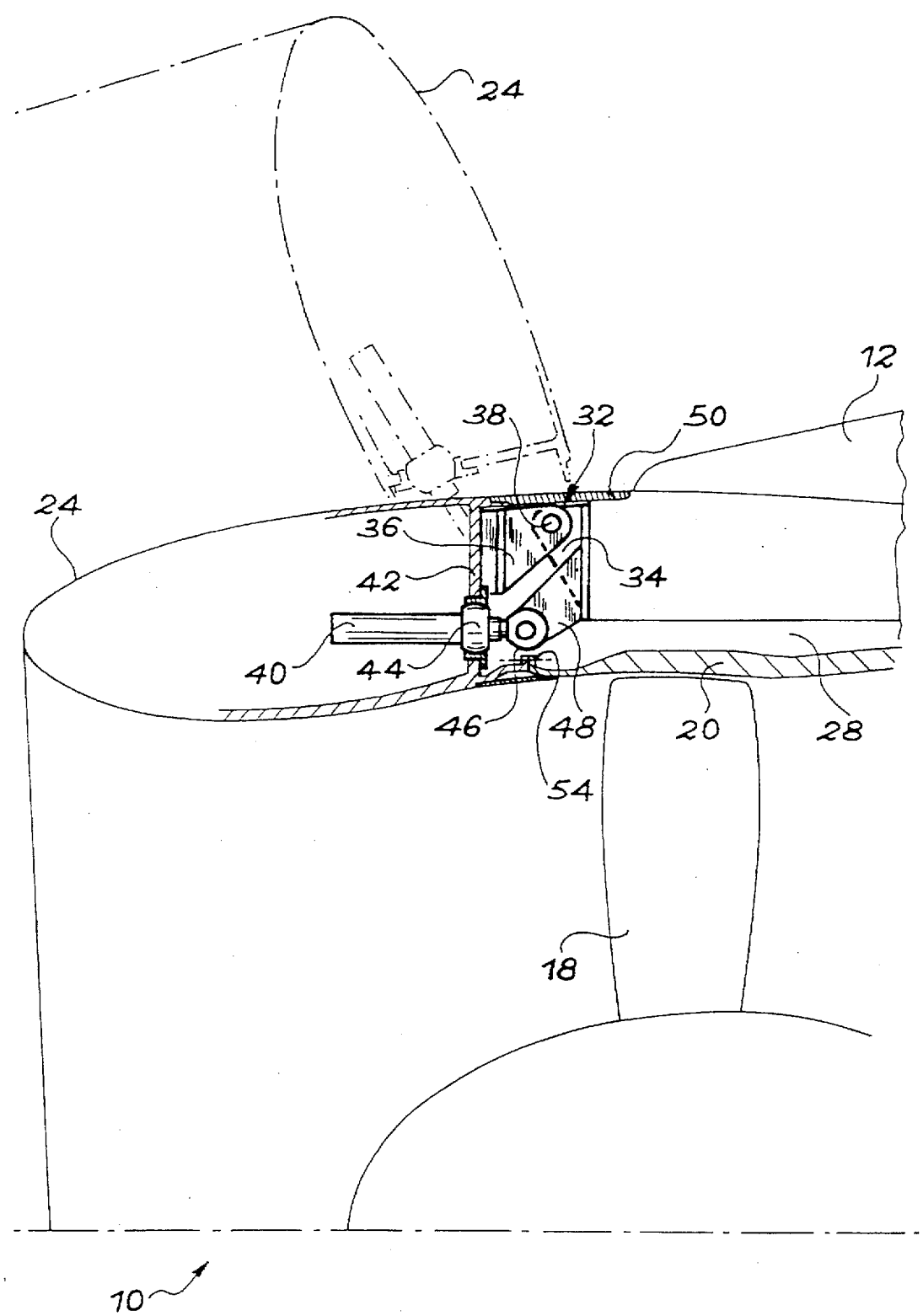
FIG. 2 is a diagrammatic longitudinal section of a detail of the device according to a first embodiment of the invention.
Figure 3:
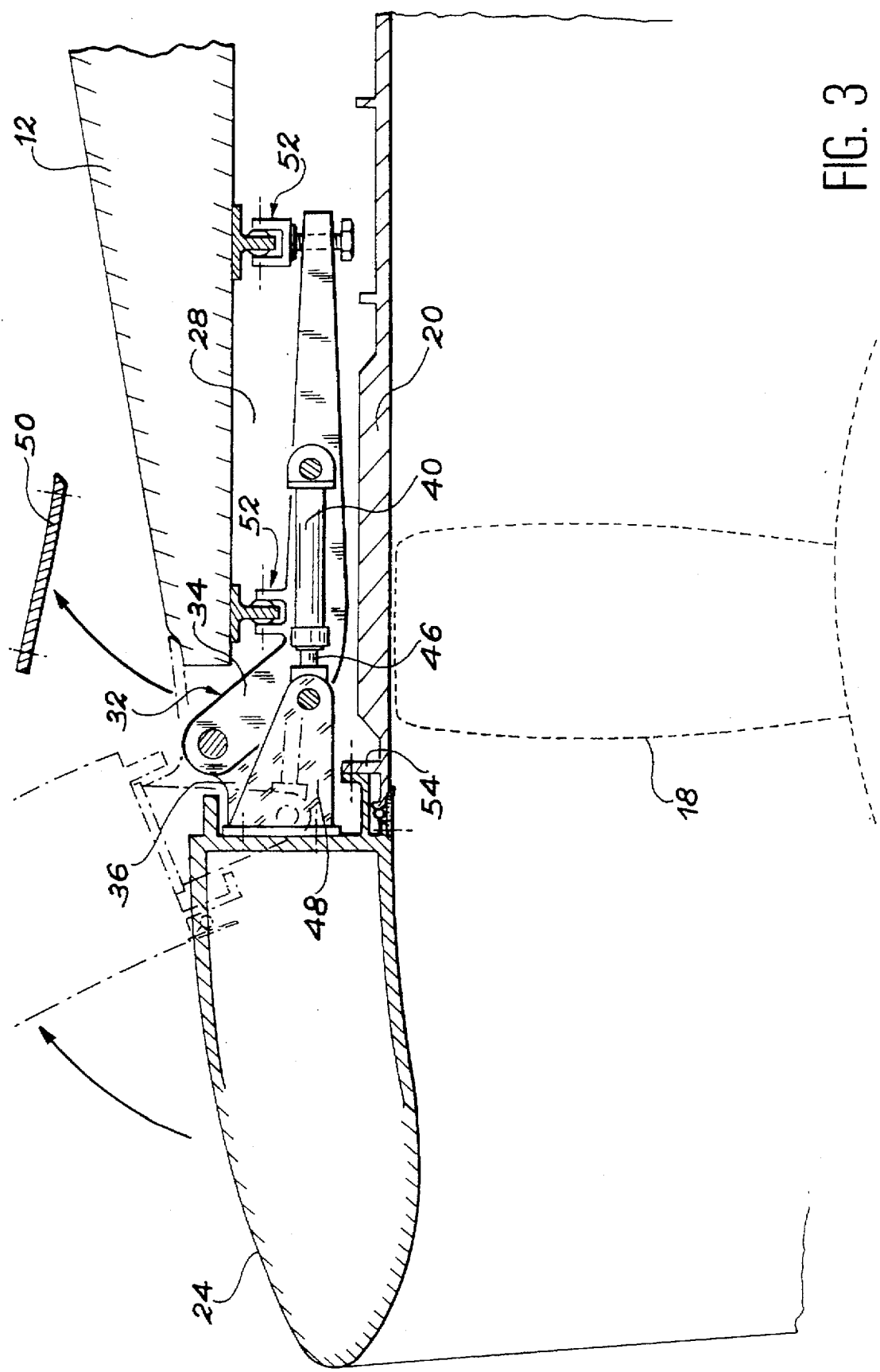
FIG. 3 is a diagrammatic longitudinal section of a detail of the device according to a second embodiment of the invention.

The air intake 24 is generally fixed to the fan frame 20 by two bolted flanges, as indicated at 54 in FIGS. 1 to 3.

According to the invention, a fixing device 30 having a hinge 32 is provided between the air intake 24 and the strut 12.

The hinge is located at the top of the jet engine and defines a pivoting axis or pin orthogonal to the longitudinal axis or pin of the fan frame 20. Thus, it makes it possible to pivot the intake 24 from a closed position, where its longitudinal axis is substantially coinciding with that of the fan frame 20, to an open position, in which the intake 24 is spaced from the frame 20, as shown in mixed line form in the drawings, and vice versa.

A set of rods 23, whereof only one is visible in FIG. 1 is housed in the pod at a position diametrically opposite to that of the hinge. The rods 23 connect the air intake 24 to the fan frame 20 and are respectively fixed to its parts by attachment means, whereof at least one can be easily released. Therefore this set of rods 23 forms means for locking the air intake to the fan frame.

Preferably, the set of rods 23 incorporates two rods forming a triangle in a plane perpendicular to that of the drawing and whereof an apex is directed towards the front end of the pod. As a result of such a configuration of the set of rods, the latter is able to transmit to the central part 14 of the engine transverse forces exerted on the air intake 24.

Another construction of the locking means, used in isolation or in association with the rod-based locking system, can consist of a locking system formed from the cowls of the intermediate part 26 of the pod.

One or more knives 25 extending to the periphery of the rear part of the air intake and shown in mixed line form in FIG. 1 cooperate with grooves 27 formed in cowls of the intermediate part 26 of the pod. These grooves 27 appear in the subsequently described FIG. 4. They extend along the front edge, turned towards the air intake of each cowl 60.

The knives 25 engage in grooves 27 of the cowls 60, located on the pod on either side of the strut, and thus lock the air intake to the pod when said cowls 60 are closed. It is clear that the knives can also be placed on the cowls and the grooves on the air intake.

Moreover, although FIG. 1 shows all the fixing and locking means described hereinbefore, it is clear that in a practical constructional embodiment, there is no need for all these fixing and locking means. In exemplified manner, when these fixing and locking means incorporate the hinge 32 and the rods 23, a coupling by bolted flanges 54 can be optional.

FIG. 2 shows in greater detail the fixing device according to a first embodiment of the invention.

Hinge 32 has one or more articulating or pivoting elements, each having a first arm 34 fixed to the support strut 12 and a second arm 36 fixed to the air intake 24. The first and second arms are articulated about a pivot 38, e.g. formed by a journal bearing or ball joints. The pivots 38 of the articulating elements define an articulation axis of the hinge.

A jack 40 controls the upward pivoting of the air intake 24 around its articulation axis, in order to space it from the fan frame and bring it into its open position shown in mixed line form. Conversely, the jack 40 slows down the pivoting in the opposite direction of the air intake on its return to its closed position.

The body of the jack 40, housed within the air intake 24, is fitted to a rear wall 42 of the intake 24 turned towards the strut 12 by means of a ball joint 44. The jack rod 46 is articulated to a clevis 48 forming an attachment and fixed to the front of the strut 12.

Thus, when the air intake 24 is in its open position, it is supported by the strut 12. Therefore a maintenance operation can be carried out no matter where the aircraft is located and even if said location has no lifting means.

The hinge is located in the interior of the pod body 28 in its intermediate part. It is accessible by an upper opening covered by a detachable cover 50.

A second embodiment of the invention is illustrated in FIG. 3. The hinge 32 has one or more articulation elements, each incorporating a first arm 34, which can be fixed to the support strut 12 and a second arm 36, which can be fixed to the air intake. The body of the jack 40 is installed in articulated manner on the arm 34 and its rod 46 on a clevis 48 forming an attachment and which can be fixed to the air intake 24.

In this embodiment, these different parts form a detachable tool system, which can be housed within the pod body 28, in the intermediate part, when a maintenance operation requires the opening of the intake 24. The first arm 34 is then fixed to the strut 12 by a system 52 of clevises and flanges articulated by ball joints, which may or may not be regulatable. This system 52 is fixed to the strut 12 by detachable fixing means, such as bolts. As a variant, it can have parts permanently fixed to the strut and detachable parts, e.g. connected to the fixed parts by detachable spindles.

The arm 36 and clevis 48 are also connected to the air intake by detachable fixing means, such as e.g. bolts. Thus, the tools can be removed during a normal use, i.e. in flight and need only be installed when it is necessary to remove the air intake.

A hatch covered by a detachable cover 50 gives access to the interior of the pod, in the vicinity of the strut 12, so as to permit the fixing of the tools thereto.

Figure 4:
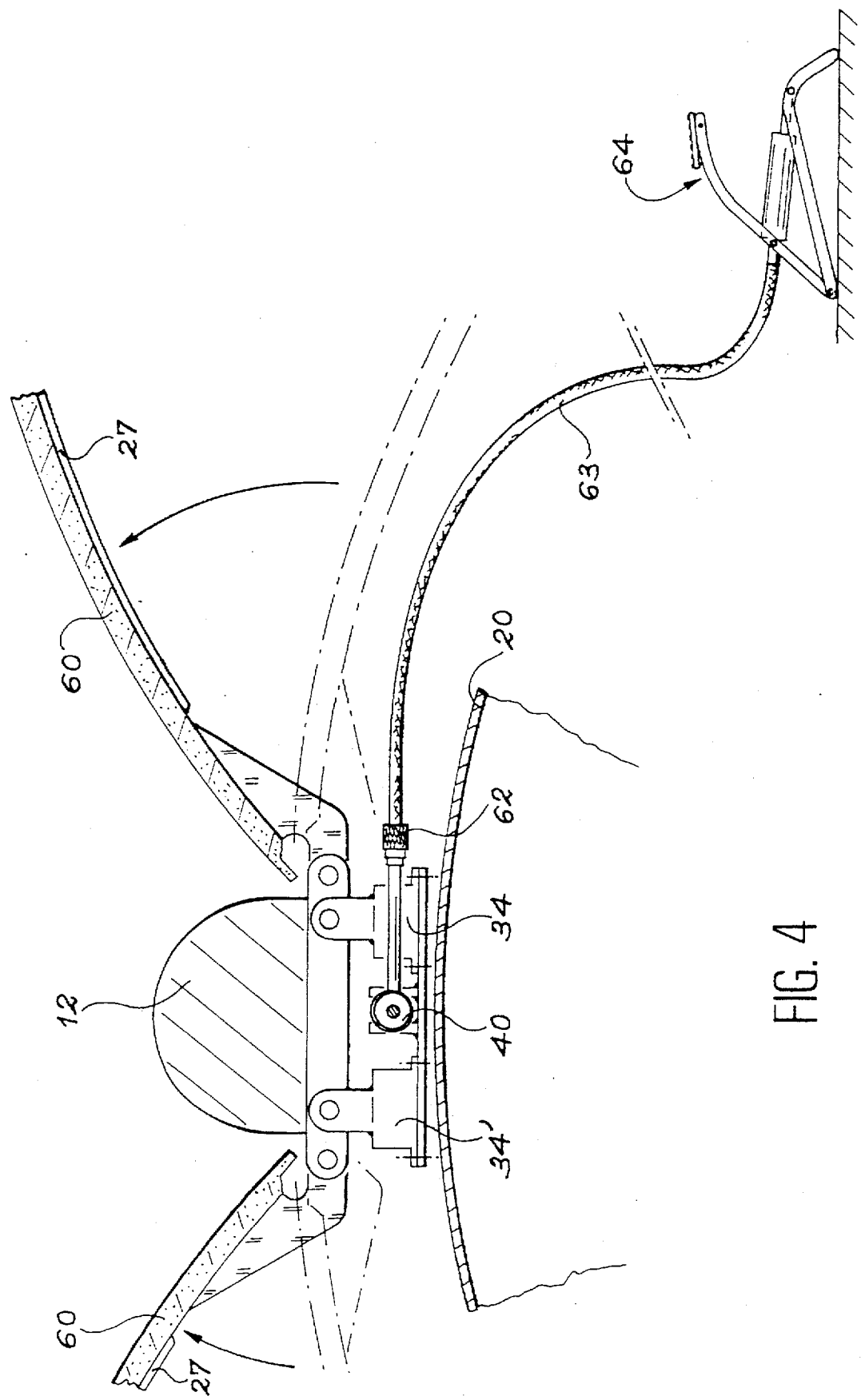
FIG. 4 is a diagrammatic cross-section of the device of FIG. 3 illustrating the use of this device.

FIG. 4 illustrates a use of the device according to the invention in the embodiment of FIG. 3. It is possible to see in FIG. 4 the strut 12, the fan frame 20, the cowls 60 of the intermediate part 26 of the pod, as well as two articulation elements of the hinge 32, whereof it is possible to see the first arms 34 and 34', as well as the jack 40. The hydraulic jack 40 is advantageously equipped with a high speed coupling 62.

The cowls 60 of the central part of the pod give access to the interior of the pod body, where may be installed various equipments or accessories. They also give access to the tools of the air intake fixing device.

In order to pivot the air intake, which is not shown in FIG. 4, a flexible tube 63 connected to a hand or foot pump 64 can be connected to the coupling 62 after removing the cowls 60 from the pod. Actuation of the pump 64 displaces the jack rod and the air intake is pivoted to its open position.

Thus, as a result of the device according to the invention, it is possible with very simple tools and which are easily available on the ground to carry out a rapid removal of the jet engine air intake, the intake remaining connected to the strut. Thus, the device renders unnecessary air intake lifting equipments, as well as equipments for the transportation and storage thereof during work on the jet engine.

We claim:

1. Device for fixing an air intake having a longitudinal axis to a jet engine installed on a support strut and the jet engine having a fan frame having a longitudinal axis, characterized in that the device incorporates a hinge installed between the air intake and the support strut of the jet engine, in order to support and pivot the air intake between a closed position, where the intake and the fan frame are arranged substantially coaxially, and an open position, where the longitudinal axis of the air intake is angularly disposed with respect to the longitudinal axis of said fan frame at an angle greater than zero degrees, said hinge having an articulation axis substantially orthogonal to the longitudinal axis of the fan frame, and the device having means for locking the air intake to the frame wherein the locking means has at least one rod connecting the air intake to the fan frame, the rod being located in a pod surrounding the fan frame in a position substantially diametrically opposite to the hinge.

2. Device according to claim 1, characterized in that the hinge (32) is fitted in detachable manner in the pod (22).

3. Device according to claim 1, characterized in that the hinge has at least one articulation element with a first arm (34) fixed to the support strut (12) and a second arm (36) fixed to the air intake (24).

4. Device according to claim 1, characterized in that the hinge (32) is equipped with at least one jack (40) for pivoting the air intake (24) from the closed position to the open position and vice versa.

5. Device according to claim 4, characterized in that the jack (40) is fitted in articulated manner between a first arm (34) and an attachment (48) fixed to the air intake.

6. Device according to claim 4, characterized in that the jack (40) is fitted in articulated manner between the air intake (24) and an attachment (48) fixed to the support strut (12).

7. Device according to claim 6, characterized in that the jack (40) is housed in the air intake (24) and is fitted by a ball joint to a wall of the air intake.

8. Device according to claim 1, characterized in that the locking means incorporate pod cowls (60), which engage with the air intake (24).

9. Device according to claim 8, characterized in that the cowls (60) engage with the air intake (24) by means of a system of knives (25) and grooves (27).

10. Jet engine having a fan and a pod (22) surrounding the fan, and said pod (22) incorporates an air intake (24) and a fan frame (20), characterized in that the jet engine is equipped with an air intake fixing device according to claim 1.

* * * * *